UNITED STATES PATENT OFFICE.

GEORGE CLARK, JR., OF BOSTON, MASSACHUSETTS.

IMPROVEMENT IN TOOTH-PICKS.

Specification forming part of Letters Patent No. 174,619, dated March 14, 1876; application filed November 27, 1875.

*To all whom it may concern:*

Be it known that I, GEORGE CLARK, Jr., of the city of Boston, Suffolk county, State of Massachusetts, have invented a new and Improved Tooth-Pick, of which the following is a specification:

My invention consists of a tooth-pick, artificially charged with a substance which either flavors it to the taste or perfumes it; and the object is to make a tooth-pick which, besides answering its usual purpose, shall gratify the sense of taste or smell, or both.

I do not confine myself to any particular mode of making my tooth-picks, or to any particular machinery to effect their production, the present invention relating solely to the peculiarity in tooth-picks above adverted to, viz, that of giving them a taste or a smell, or both. In the manufacture of my improved tooth-picks I sometimes use essential or volatile oils, as oil of checkerberry, peppermint, or lemon, and sometimes these oils, mixed with fixed oils, such as olive-oil, cotton-seed or rape-seed oil, or other liquid substance, such as alcohol, as a vehicle or menstruum. I also use, sometimes, a saccharine solution, and sometimes an aqueous decoction or an alcoholic tincture of vegetable substances, such as sassafras-bark or gum-benzoin, &c. I impregnate the tooth-picks either in the woody mass or after they have been manufactured into shape, and I do this sometimes by simply steeping the wood in the liquid carrying the desired taste or smell, and sometimes by placing the wood or the tooth-picks in a closed vessel and exhausting the air, and then injecting the liquid in upon the wood, which absorbs it by capillary attraction; and sometimes I stack the tooth-picks in such manner as that the mass is pervious to any aerated application, and then, by means of heat, reducing my aromatic substances to an aeriform state or volatilizing them, I expose the tooth-picks to the scented atmosphere, which impregnates them with the desired perfume. The useful effect produced is, first, that of making the articles more attractive; and, secondly, that of perfuming the breath when in use.

I claim—

As a new article of manufacture, a wooden tooth-pick, as described, when artificially impregnated with a flavor or perfume, substantially as and for the purpose specified.

GEORGE CLARK, JR.

Witnesses:
 LEMUEL P. JENKS,
 HENRY WALKER.